United States Patent [19]
Wheatley

[11] Patent Number: 5,279,418
[45] Date of Patent: Jan. 18, 1994

[54] TAPE CASSETTE PROTECTIVE COVER

[76] Inventor: Robert M. Wheatley, 2 Edwards St., Apt. 3B, Roslyn, N.Y. 11577

[21] Appl. No.: 983,775

[22] Filed: Dec. 1, 1992

[51] Int. Cl.⁵ ............................... B65D 85/575
[52] U.S. Cl. ............................. 206/387; 206/485
[58] Field of Search ............ 206/307, 309, 310, 387, 206/444, 485

[56] References Cited

U.S. PATENT DOCUMENTS

| | | |
|---|---|---|
| Re. 30,184 | 1/1980 | Ackeret . |
| D. 223,739 | 5/1992 | Weiss . |
| 3,635,350 | 1/1972 | Wolf . |
| 3,746,180 | 7/1973 | Spiroch et al. . |
| 3,909,088 | 9/1975 | Dennehey et al. . |
| 3,912,077 | 10/1975 | Krynicki ........................ 206/387 |
| 3,946,865 | 3/1976 | Bierwas . |
| 4,119,200 | 10/1978 | Cassidy et al. .................. 206/387 |
| 4,125,189 | 11/1978 | Fujimoto et al. ................ 206/387 |
| 4,248,345 | 2/1981 | Bowers . |
| 4,304,331 | 12/1981 | Minkow . |
| 4,327,952 | 5/1982 | Cournoyer et al. ............... 206/387 |
| 4,365,712 | 12/1982 | Oishi et al. . |
| 5,158,176 | 10/1992 | Wolf ................................ 206/387 |

FOREIGN PATENT DOCUMENTS 2387493 12/1978 France ............................ 206/387

Primary Examiner—Jimmy G. Foster
Attorney, Agent, or Firm—Collard & Roe

[57] ABSTRACT

A tape cassette protective cover is designed to fit securely over the open tape transport region of a tape cassette. The cover includes a C-shaped plastic cover having a semi-circular lip which fits over the apertures in a tape cassette. The cover has an elongated walled trough section with a corresponding end section at each end which fits over the sides of the tape cassette. Each end section is grooved or perforated, such that the protrusion located at the sides of a tape cassette slides into the end section and securely fits within the groove or the perforation.

12 Claims, 3 Drawing Sheets

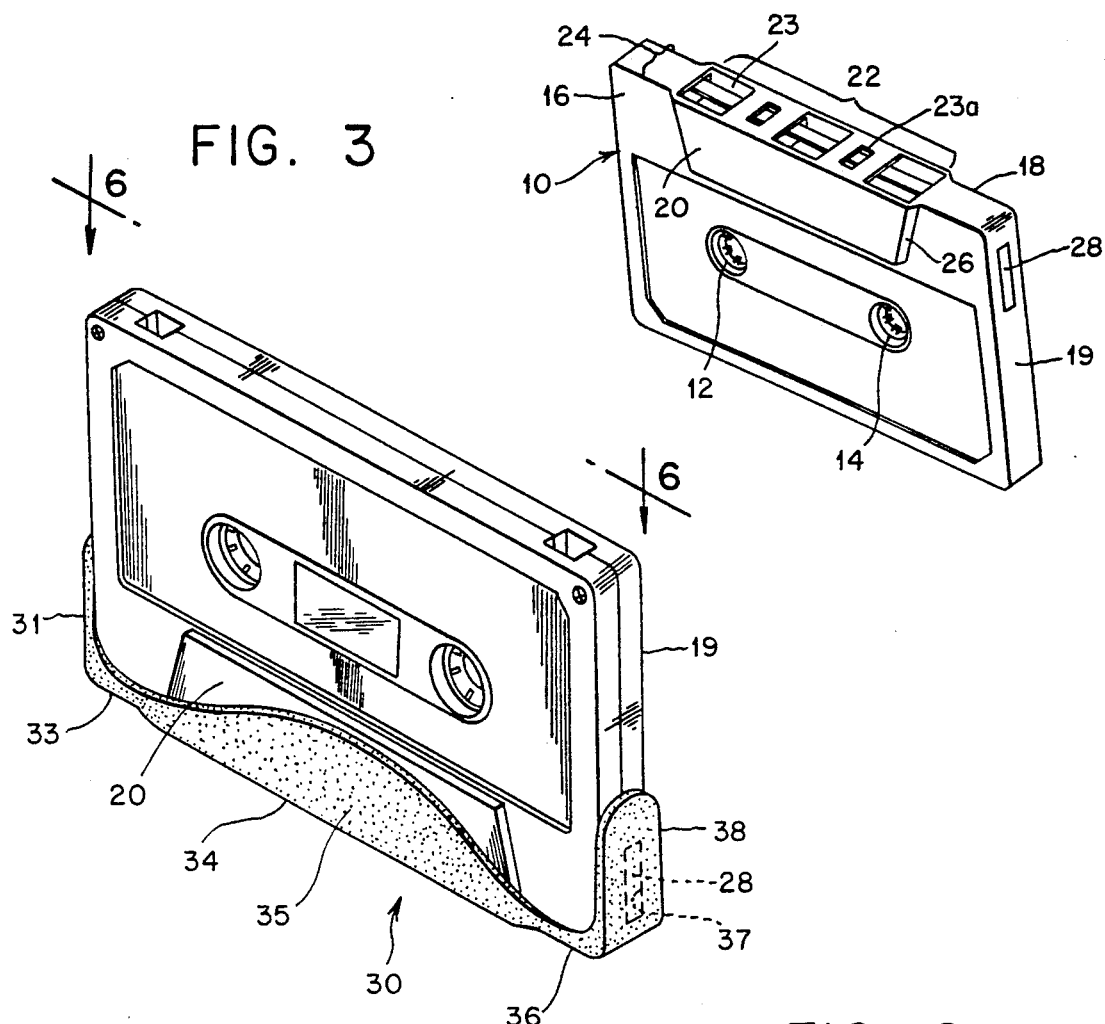
FIG. 1 (PRIOR ART)
FIG. 3
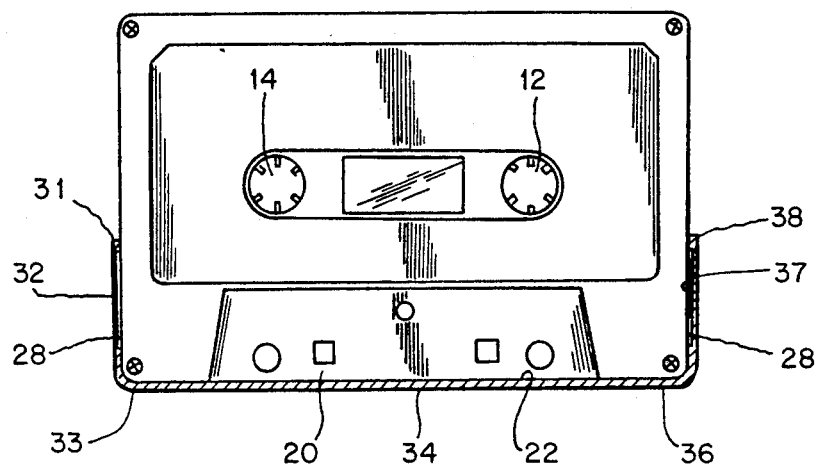
FIG. 6

TAPE CASSETTE PROTECTIVE COVER

BACKGROUND OF THE INVENTION
1. Field of the Invention

The present invention relates to a tape cassette protective cover which is designed to fit securely over the open tape transport region of a tape cassette.

2. The Prior Art

Attempts have been made in the past to provide protective means for tape cassettes. Prior proposals are as follows.

The Minkow U.S. Pat. No. 4,304,331 discloses a shield for magnetic tape cassettes having a rectangular outer edge which protects the open tape transport region of a tape cassette and an apron folded at a 90° angle with respect to the outer edge. The apron extends over the apertures at the bottom of the tape cassette and has two spaced prongs which are fitted into the two large winding apertures located at the center of the tape cassette.

The Bowers U.S. Pat. No. 4,248,345 shows a protective cap for a recording tape cassette having a plastic strip cover that extends along the bottom tape region of a tape cassette. The strip cover has a plurality of prongs at its inner side which are designed to be inserted into the bottom of the tape cassette.

The Spiroch U.S. Pat. No. 3,746,180 discloses a device for the storage of magnetic tape cassettes having an elongated plastic rail that is fitted over the bottom of a tape cassette. The plastic rail has U-shaped cross-sectional configuration with panels that grip and securely fasten to the bottom of the tape cassette. Nibs or projections are provided at the inner surface of these panels and are inserted into the apertures located at the bottom of a tape cassette. This device is mainly a rail to be used in conjunction with a storage case for tape cassettes.

The Oishi U.S. Pat. No. 4,365,712 shows a magnetic tape cassette receiving casing. The cassette shown in the drawings has a rotatable cover. Although the cover is rotatable, it has an elongated strip covering the bottom of a tape cassette with two side portions which grip the sides of a tape cassette, giving it a C-shaped configuration.

The Bierwas U.S. Pat. No. 3,946,856 shows a container for a tape cassette having a U-shaped bracket which fits over the outer portions of a tape cassette.

Other prior art of interest are as follows:

| U.S. Pat. No. | Inventor(s) |
| --- | --- |
| 4,272,167 | Kempster |
| 3,909,088 | Dennehey et al. |
| 3,635,350 | Wolf |
| Re. 30,184 | Ackeret |
| Des. 223,739 | |

SUMMARY OF THE INVENTION

It is an object of the present invention to provide a tape cassette protective cover which is designed to fit securely over the open tape transport region between the sides of a tape cassette, comprising a C-shaped cover having walls which define an elongated trough, with said walls receiving and enclosing the open tape transport region of the tape cassette, said cover having an integrally formed end section disposed at each end of the elongated trough, each end section slidably receiving and partially fitting over the sides of the tape cassette.

BRIEF DESCRIPTION OF THE DRAWINGS

Other objects and features of the present invention will become apparent from the following detailed description considered in connection with the accompanying drawings, which disclose two embodiments of the present invention. It should be understood, however, that the drawings are designed for the purpose of illustration only and not as a definition of the limits of the invention.

In the drawings, wherein similar reference characters denote similar elements throughout the several views:

FIG. 1 shows a perspective view of a prior art tape cassette;

FIG. 3 shows a perspective view of the tape cassette protective cover according to the present invention in position for protecting a tape cassette;

FIG. 6 shows a partial cross-sectional view of the protective cover of the invention along line 6—6 in FIG. 3.

DETAILED DESCRIPTION OF PREFERRED EMBODIMENTS

Figure 2:
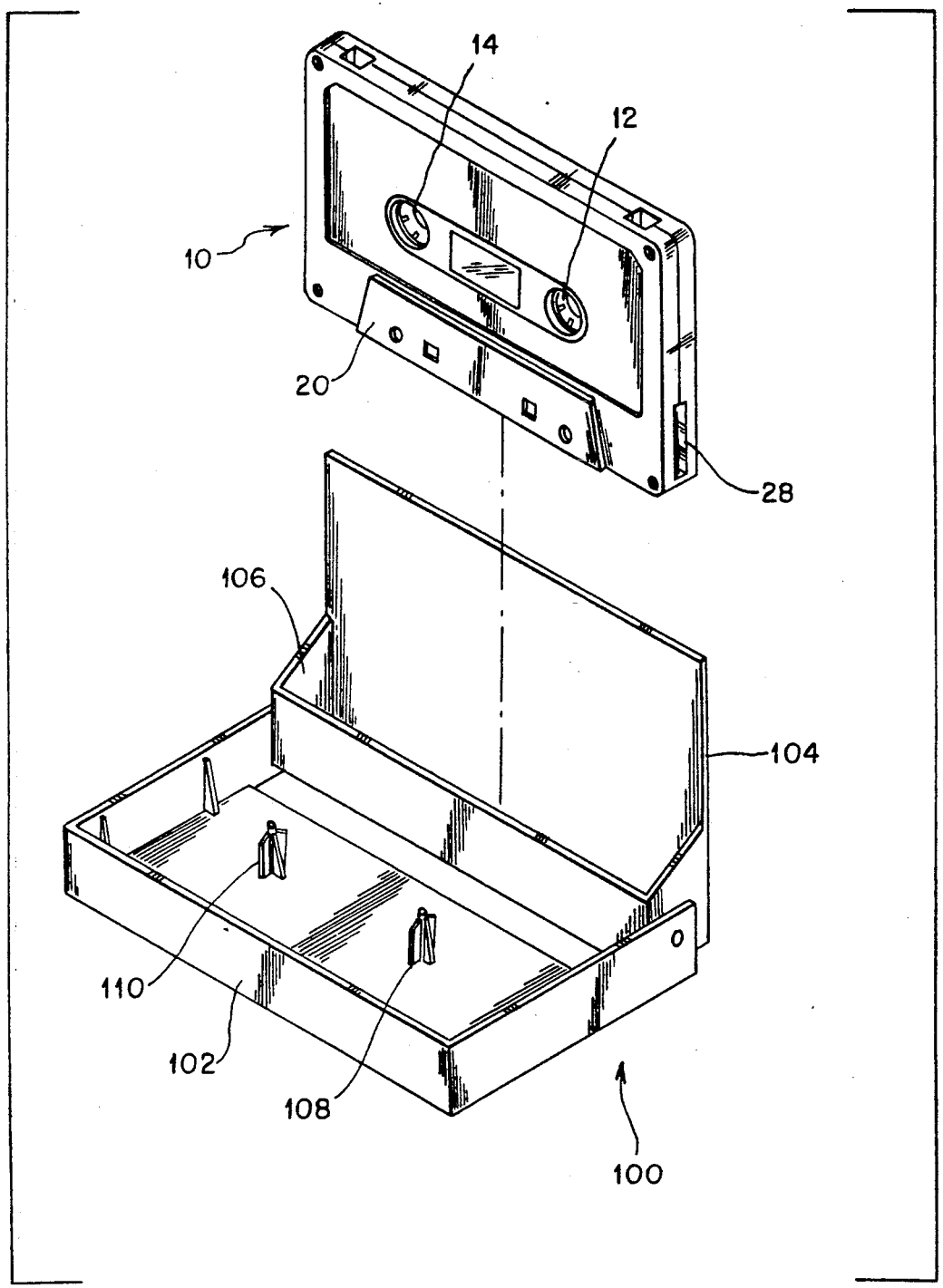
FIG. 2 shows a perspective view of a prior art cassette case for holding a tape cassette.

Turning now in detail to the drawings, FIG. 1 shows a conventional magnetic tape cassette 10 of known construction. The cassette has a pair of sprocket holes 12 and 14, opposed parallel side surfaces 16 and 18 defining an edge thickness of the cassette and a shaped boss 20 raised from each of the surfaces 16 and 18. The boss is in the shape of an isosceles trapezoid on each surface with the long edge defining an open tape transport region 22 having large apertures 23 and small apertures 23a. The cassette 10 has a thickness 24, and the boss 20 has a thickness 26. Cassette 10 has side protrusions 28 that are located on side walls 19 adjacent to transport region 22.

FIG. 2 shows an exploded view of tape cassette 10 and tape cassette holder 100 according to the prior art. Holder 100 has a base 102 and a cassette housing 104 which includes a cassette pocket 106 into which the cassette 10 will fit. Projections 108 and 110 fit within sprocket holes 12 and 14, respectively, when the housing is folded down to enclose the base 102 with the cassette 10 within the pocket 106. The combination of holder 100 having cassette 10 held therewithin is the usual manner in which the cassette 10 is normally sold. However, holder 100 is easily damaged or lost, and those disadvantages are overcome by the present invention.

Figures 4, 5:
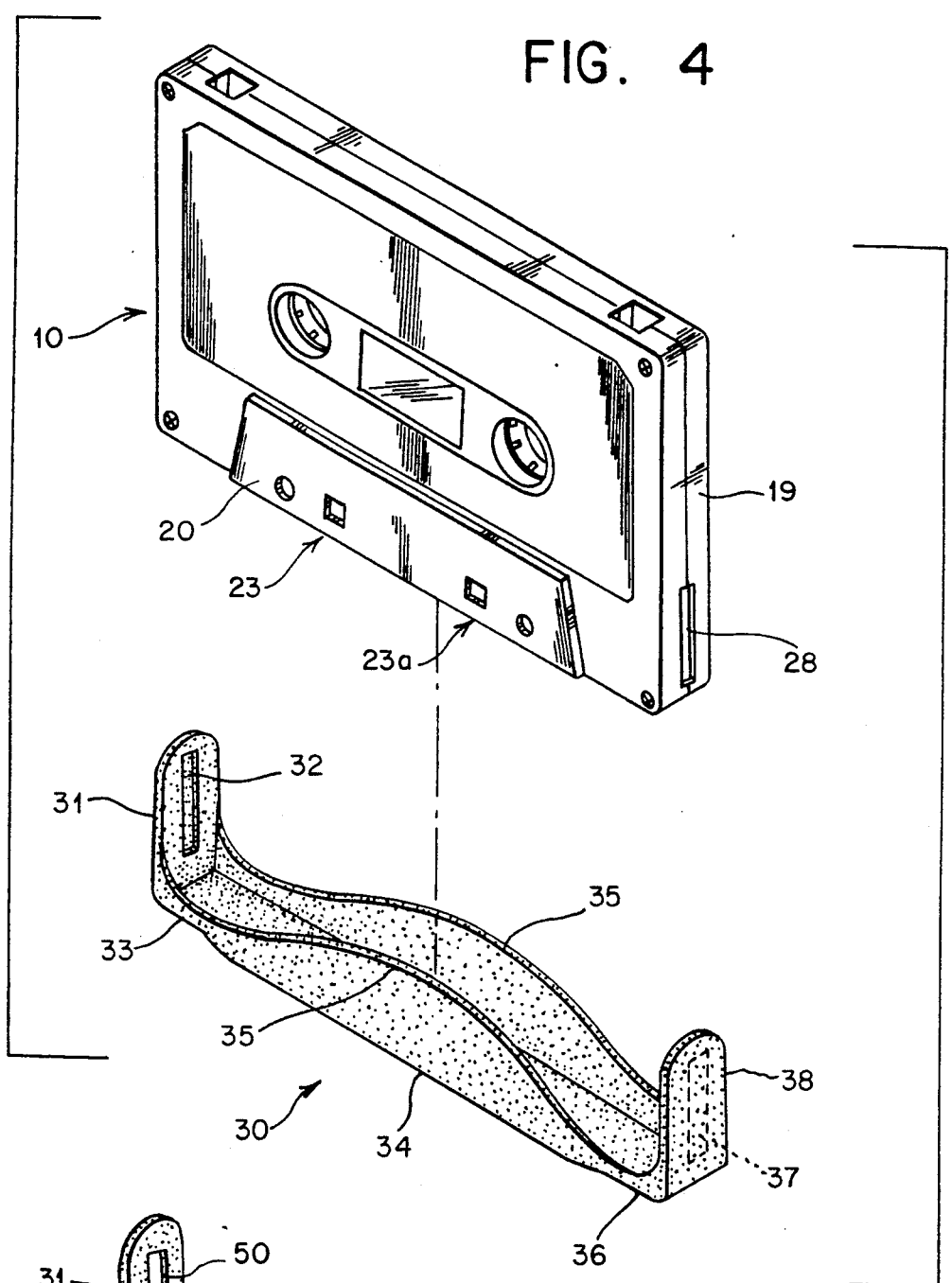
FIG. 4 shows an exploded perspective view of the tape cassette protective cover of FIG. 3 according to the present invention having a grooved end section.
FIG. 5 shows another embodiment of the invention, in which the end section is perforated.

FIGS. 3 and 4 illustrate the improvement according to the present invention. The present invention provides an improved tape cassette protective cover 30 which is designed to fit securely over the open tape transport region 22 between the sides of a tape cassette 10. The cover 30 includes a C-shaped cover having walls which define an elongated trough, with the walls receiving and enclosing the open tape transport region and having a concave downward semi-circular lip 35 which fits over the apertures 23 and 23a in the transport region of the boss 20 of the tape cassette 10. In other words, the cover 30 has an elongated flat bottom trough or section 34 located beneath the semi-circular lip 35 with trough or section 34 having concave upwardly shaped ends 33 and 36 with a corresponding integrally formed end section 31 and 38, respectively, disposed and attached at each end 33 and 36. End sections 31 and 38 slidably receive and partially fit over the sides 19 of the tape cassette. The cover has a general thickness of 0.8 mm. Each end section 31 and 38 is perpendicular to the flat bottom 34 and parallel to each other and has a vertical groove 32 and 37, respectively, such that the elongated protrusion 28 located at the sides 19 of a tape cassette slides into the end section 31 or 38 and securely fits into the groove by mating engagement therewith. Each wall of the trough comprises, preferably, the semi-circular lip which is concave downward in shape. The elongated trough includes a flat bottom located beneath each semi-circular lip preferably for seating and covering the transport region of the cassette. The end section has a concave upwardly shaped end wall integrally connected to each semi-circular lip. Each end section 31 and 38 has essentially the same height as shown in FIGS. 4 and 5, and the tape cassette side 19 has a length. The height of each end section is less than the length of the side of the cassette.

FIG. 5 illustrates a second embodiment wherein end section 31 has a vertical perforation 50 instead of groove 32, and end section 38 has a vertical perforation 52 instead of groove 37. In this embodiment, the protrusion 28 located at the sides 19 of the tape cassette slides into the end section 31 or 38 and securely fits within, and projects outwardly through, the perforation by mating engagement therewith.

FIG. 6 shows a partial cross-sectional view of the protective cover of the invention along line 6—6 of FIG. 3. Here it can be seen how the open tape transport region 22 fits flush against the flat bottom of the elongated trough 34, while protrusions 28 fit within groove 32 or 37. Thus, the protective cover receives and encloses the open tape transport region.

The protective cover 30 can be made from an impact-resistant and heat-resistant plastic material such as thermoplastic, for example a polyolefin such as polyethylene or polypropylene, or polyvinyl chloride, by known methods of manufacture such as thermal forming, hot pressing, as well as injection molding. It is also possible to make cover 30 from a thermosetting resin material such as phenol formaldehyde by injection molding, for example.

The difference between groove or slot 32 or 37 and perforation 50 or 52 is that the groove or slot only slightly penetrates the end section, whereas the perforation completely penetrates through the end section.

The present invention has the following advantages. The tape cassette protective cover prevents damage to the tape when the cassette is being transported, but not in its regular protective case 100. The protector also prevents dirt and dust from entering the cassette from the normally exposed area in the front. The cover of the invention protects against sun exposure, tape damage caused by dropping or by friction against any surface making contact with the tape, dust or dirt exposure, and limited protection against water and moisture contact. It is also less expensive to manufacture than conventional cassette holder 100 shown in FIG. 2. It also uses less plastic than holder 100, is of a single piece construction, and, if discarded, provides less waste material than conventional covers.

While only a single embodiment of the present invention has been shown and described, it is to be understood that many changes and modifications may be made thereunto without departing from the spirit and scope of the invention as defined in the appended claims.

I claim:

1. A tape cassette protective cover which is designed to fit securely over the open tape transport region between the sides of a tape cassette, each side of the cassette including an elongated protrusion, said protective cover comprising:

a C-shaped cover having walls which define an elongated trough, with said walls receiving and enclosing the open tape transport region of the tape cassette, said cover having an integrally formed end section disposed at each end of the elongated trough, each end section slidably receiving and partially fitting over the sides of the tape cassette;

a groove formed in each end section of the protective cover, such that the elongated protrusion located on the side of a tape cassette slides into the end section and securely fits therein by the mating engagement of the protrusion with the groove in the end section; and the height of each end section being less than the length of the side of the cassette.

2. The tape cassette protective cover according to claim 1, wherein the cover is made from a plastic material.

3. The tape cassette protective cover according to claim 2, wherein the plastic material is a thermoplastic material.

4. The tape cassette protective cover according to claim 3, wherein the thermoplastic material is selected from the group consisting of a polyolefin and polyvinyl chloride.

5. The tape cassette protective cover according to claim 2, wherein the plastic material is a thermosetting resin.

6. The tape cassette protective cover according to claim 5, wherein the thermosetting resin is phenol formaldehyde.

7. The tape cassette protective cover according to claim 1, wherein each wall of the trough comprises a semi-circular lip which is concave downward in shape.

8. The tape cassette protective cover according to claim 7,
wherein the elongated trough includes a flat bottom located beneath each semi-circular lip for seating and covering the transport region of the cassette.

9. The tape cassette protective cover according to claim 7, wherein said end section comprises
a concave upwardly shaped end wall and integrally connected to each semi-circular lip.

10. A tape cassette protective cover which is designed to fit securely over the open tape transport region between the sides of a tape cassette, comprising:

a C-shaped cover having walls which define an elongated trough, with said walls receiving and enclosing the open tape transport region of the tape cassette, said cover having an integrally formed end section disposed at each end of the elongated trough, each end section slidably receiving and partially fitting over the sides of the tape cassette;

wherein each side of the cassette has a protrusion, and comprising a corresponding perforation formed in each end section of the protective cover, such that the protrusion located on the side of a tape cassette slides into the end section and securely fits therein by the mating engagement of the protrusion within the perforation formed in the end section; and the height of each end section being less than the length of the side of the cassette.

11. A tape cassette protective cover which is designed to fit securely over the open tape transport region between the sides of a tape cassette, each side of the cassette including an elongated protrusion, said protective cover comprising:

a C-shaped cover having walls which define an elongated trough, with said walls receiving and enclosing the open tape transport region of the tape cassette, said cover having an integrally formed end section disposed at each end of the elongated trough, each end section slidably receiving and partially fitting over the sides of the tape cassette;

a groove formed in each end section of the protective cover, such that the elongated protrusion located on the side of a tape cassette slides into the end section and securely fits therein by the mating engagement of the protrusion with the groove in the end section; and each said end being integrally formed with a corresponding end of said trough.

12. A tape cassette protective cover which is designed to fit securely over the open tape transport region between the sides of a tape cassette, each side of said cassette having a protrusion, said protective cover comprising:

a C-shaped cover having walls which define an elongated trough, with said walls receiving and enclosing the open tape transport region of the tape cassette, said cover having an integrally formed end section disposed at each end of the elongated trough, each end section slidably receiving and partially fitting over the sides of the tape cassette;

a perforation formed in each end section of the protective cover, such that the protrusion located on the side of a tape cassette slides into the end section and securely fits therein by the mating engagement of the protrusion within the perforation formed in the end section; and each said end section being integrally formed with a corresponding end of said trough.

* * * * *